United States Patent
Park et al.

(10) Patent No.: US 8,891,551 B2
(45) Date of Patent: Nov. 18, 2014

(54) IPV6 OVER IPV4 TRANSITION METHOD AND APPARATUS FOR IMPROVING PERFORMANCE OF CONTROL SERVER

(75) Inventors: Pyung Koo Park, Daejeon (KR); Sung Back Hong, Daejeon (KR); Kyeong Ho Lee, Daejeon (KR); Kyung Pyo Jun, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 772 days.

(21) Appl. No.: 12/667,379

(22) PCT Filed: Apr. 8, 2008

(86) PCT No.: PCT/KR2008/001982
§ 371 (c)(1),
(2), (4) Date: Dec. 30, 2009

(87) PCT Pub. No.: WO2009/005212
PCT Pub. Date: Jan. 8, 2009

(65) Prior Publication Data
US 2011/0013647 A1    Jan. 20, 2011

(30) Foreign Application Priority Data

Jul. 4, 2007  (KR) ................. 10-2007-0067266

(51) Int. Cl.
*H04L 12/28* (2006.01)
*H04L 29/12* (2006.01)
*H04L 12/701* (2013.01)
*H04L 12/46* (2006.01)

(52) U.S. Cl.
CPC ........ *H04L 12/4633* (2013.01); *H04L 61/2592* (2013.01); *H04L 45/00* (2013.01); *H04L 61/6086* (2013.01); *H04L 29/12358* (2013.01); *H04L 61/251* (2013.01)
USPC .......................... 370/466; 370/401; 370/395.5

(58) Field of Classification Search
CPC .................. H04L 29/06068; H04L 29/06142
USPC ............ 370/229, 230, 230.1, 231, 237, 351, 370/389, 392, 395.2, 395.21, 395.31, 395.5, 370/395.52, 401, 431, 437, 465, 466
See application file for complete search history.

(56) References Cited

U.S. PATENT DOCUMENTS 6,996,414 B2 * 2/2006 Vishwanathan et al. ...... 455/518
7,031,328 B2   4/2006 Thubert et al.

(Continued)

FOREIGN PATENT DOCUMENTS

JP    2004-104664 A    4/2004
JP    2004-254318 A    9/2004

(Continued)

OTHER PUBLICATIONS

International Search Report for PCT/KR2008/001982 filed Apr. 8, 2008.

(Continued)

*Primary Examiner* — Edan Orgad
*Assistant Examiner* — Curtis A Alia

(57) ABSTRACT

The present invention relates to a method and apparatus for performing IPv6 over IPv4 transition to improve performance of a control server. When an edge router selected by the control server according to a tunnel creation request of an IPv6 terminal receives a tunnel creation request message from the control server, the edge router transmits a tunnel creation response message for the received tunnel creation request message to the IPv6 terminal through the control server, and the edge router performs IPv6 over IPv4 transition through a tunnel created by the IPv6 terminal that received the tunnel creation response message so as to improve the performance of the control server. Therefore, loads of the control server occurred because all terminals set control tunnels to the control server can be prevented, and service extensibility due to the increase in the number of subscribers can be guaranteed.

12 Claims, 9 Drawing Sheets

(56) References Cited

U.S. PATENT DOCUMENTS

| | | | |
|---|---|---|---|
| 7,245,622 B2* | 7/2007 | Huitema | 370/392 |
| 2002/0006133 A1* | 1/2002 | Kakemizu et al. | 370/401 |
| 2004/0013130 A1* | 1/2004 | Blanchet et al. | 370/466 |
| 2004/0162909 A1 | 8/2004 | Choe et al. | |
| 2004/0174883 A1* | 9/2004 | Johansson et al. | 370/395.31 |
| 2004/0190549 A1* | 9/2004 | Huitema | 370/466 |
| 2004/0264465 A1* | 12/2004 | Dunk | 370/392 |
| 2006/0028285 A1 | 2/2006 | Jang et al. | |
| 2006/0203828 A1* | 9/2006 | Kumazawa et al. | 370/400 |
| 2006/0233175 A1* | 10/2006 | Ge et al. | 370/392 |
| 2006/0259608 A1 | 11/2006 | Kim et al. | |
| 2007/0258399 A1 | 11/2007 | Chen | |
| 2008/0225868 A1* | 9/2008 | Sehgal et al. | 370/401 |

FOREIGN PATENT DOCUMENTS

| | | |
|---|---|---|
| JP | 2007-534251 A | 11/2007 |
| KR | 1020060111810 A | 10/2006 |
| WO | WO 2005/002171 A1 | 1/2005 |
| WO | WO 2005/104480 A2 | 11/2005 |

OTHER PUBLICATIONS

Written Opinion of the International Searching Authority for PCT/KR2008/001982 filed Apr. 8, 2008.

* cited by examiner

Fig. 5

| IP HEADER(FROM SERVER OR ROUTER) – IPv6 OR IPv4 |||||
|---|---|---|---|---|
| CMD | TYPE | NAT | NAT PORT | LIFT TIME |
| TERMINAL(IPv4 ADDRESS) – COA |||||
| TERMINAL(IPv4 ADDRESS) – PRIVATE COA |||||
| TERMINAL(IPv6 ADDRESS) |||||

IPV6 OVER IPV4 TRANSITION METHOD AND APPARATUS FOR IMPROVING PERFORMANCE OF CONTROL SERVER

TECHNICAL FIELD

The present invention relates to a server based IPv6 over IPv4 transition method and apparatus, and more particularly, to a control server based IPv6 over IPv4 transition method and apparatus for improving performance of the control server.

BACKGROUND ART

In general, a control server based IPv6 over IPv4 transition method is a method (referred to as RFC 2529 and RFC 3053) of creating a control tunnel to the control server in order to enable a service terminal to register its service in the control server and require converted address information on a terminal to be communicated. An IPv6 terminal requires an IPv4 address that can communicate with an IPv6 address of a reception terminal (the other side) from the control server by using the created control tunnel and obtains the IPv4 address. Each terminal transmits a tunnel creation request message to the control server in order to initially create a control tunnel so as to be registered in the control server, so that the aforementioned information can be managed.

As conventional methods for IPv6 over IPv4 transition, there are translation methods and server based transition methods.

The translation method is a method in which a network address translator is provided between two different IP version networks to enable IPv6 and IPv4 connection. In this method, address translation has to be performed on all packets, so that there is a problem of extensibility.

The server based transition (IPv6 over IPv4 transition) methods may be classified into tunnel broker (referred to as RFC 3053), Teredo, and intra-site automatic tunnel addressing protocol (ISATAP).

The tunnel broker is a device for relaying tunnels, and a terminal in an IPv4 network creates a tunnel to a gateway between the IPv4 and IPv6 networks. Here, the control tunnel is created to enable a terminal in the IPv4 network to register its own information in a server to communicate with a terminal in the IPv6 network, and acquire information to communicate with a terminal on the other side.

Next, Teredo uses a method similar to the tunnel broker method but is not assigned officially by the Internet assigned numbers authority (LANA). However, in this method, a prefix for Teredo is defined additionally, and a protocol is designed to include a possibility in which a terminal in the IPv4 network is under the network address translation (NAT). However, the tunnel broker method describes a general structure in the RFC 3063 but is practically implemented in consideration of address translation, so that the Teredo and the tunnel broker method are not much different from each other. In addition, since Teredo can extract an IPv4 address from an IPv6 address, terminals can directly communicate with each other without passing through a device such as a Teredo relay, and this is a difference between the two methods.

The ISATAP is an automatic tunneling method used between terminals or between a terminal and a router to provide communications between a terminal in an IPv4 intranet and another terminal in the same intranet or a terminal in an IPv6 public network connected to the intranet. This method is a protocol that is not standardized by RFC yet but basically provided in Microsoft Windows operating systems. ISATAP addresses use the interface identifier ::0:5EFE:w.x.y.z, in which w.x.y.z is an IPv4 address. The ISATAP interface identifier can be combined with any 64-bit prefix that is valid for IPv6 unicast addresses.

As described above, the ISATAP address includes IPv4 source and destination addresses used to transmit ISATAP traffic through an IPv4 network such as an IPv4-compatible address, a 6 over 4 address, and a 6 to 4 address.

However, the aforementioned general IPv6 over IPv4 transition method has problems in that as the number of service terminals increases, the number of control tunnels increases, and a control server has loads of tunnel management. This is because the control server measures a lifetime of each control tunnel and deletes or maintains the control tunnel after a service from a terminal is terminated. In addition, the control server enables forwarding to transmit data to the terminal to be communicated through the control tunnel. As described above, maintaining the control tunnel and data forwarding through the control tunnel may cause degradation in performance of the control server.

DISCLOSURE OF INVENTION

Technical Problem

The present invention provides an IPv6 over IPv4 transition method and apparatus for easily managing control tunnels regardless of the increase in the number of service terminals and enabling data forwarding through the tunnels to improve the performance of a control server and service stability.

Technical Solution

According to an aspect of the present invention, there is provided a method of performing IPv6 over IPv4 transition in a router connected between an IPv6 terminal and a control server to improve performance of the control server, including steps of: receiving a tunnel creation request message from the control server operating on the basis of a tunnel creation request of the IPv6 terminal; transmitting a tunnel creation response message for the received tunnel creation request message to the IPv6 terminal through the control server; and performing IPv6 over IPv4 transition through a tunnel created by the IPv6 terminal that receives the tunnel creation response message.

According to another aspect of the present invention, there is provided a method of performing IPv6 over IPv4 transition in a control server connected between an IPv6 terminal and a plurality of routers to improve performance of the control server, including steps of: receiving a tunnel creation request message from the IPv6 terminal in an IPv4 network through the IPv4 network; selecting an edge router from the routers registered in advance to create a tunnel between the edge router and the IPv6 terminal; transmitting the tunnel creation request message to the selected edge router; receiving a tunnel creation response message corresponding to the tunnel creation request from the selected edge router and transmitting the received tunnel creation response message to the IPv6 terminal; and when the tunnel creation response message is received and the message is transmitted to the edge router from the IPv6 terminal through the created tunnel, receiving a message that is IPv6 transited over IPv4 from the edge router.

According to another aspect of the present invention, there is provided an which is connected between an IPv6 terminal and a control server to perform IPv6 over IPv4 transition, including: an IPv6 terminal interface interfacing with the IPv6 terminal through an IPv4 network and setting a tunnel with the IPv6 terminal to transmit/receive messages; a forwarding controller, when the apparatus is selected as an edge router to set a tunnel by the control server and receives a tunnel creation request message from the control server, transmitting a tunnel creation response message including information on the apparatus to the control server, and when the IPv6 terminal receives the tunnel creation response message from the control server, performing IPv6 over IPv4 transition; a routing table registering routing information included in the tunnel creation request message; and a control server interface interfacing with the control server through IPv6 when receives a message from the IPv6 terminal through the created tunnel.

Advantageous Effects

As described above, the control tunnel between the edge router selected by the control server and the terminal is created, and the control tunnel can be easily managed regardless of the increase in the number of service terminals and data forwarding is possible. Therefore, loads of the control server occurred because all terminals set control tunnels to the control server can be prevented, the performance of the control server is improved and service stability is increased, and service extensibility due to the increase in the number of subscribers can be guaranteed.

BRIEF DESCRIPTION OF THE DRAWINGS

FIG. 5 is a view illustrating a tunnel request message transmitted from the control server to the router in the server based IPv6 over IPv4 transition system according to the embodiment of the present invention.

BEST MODE FOR CARRYING OUT THE INVENTION

Figure 1:
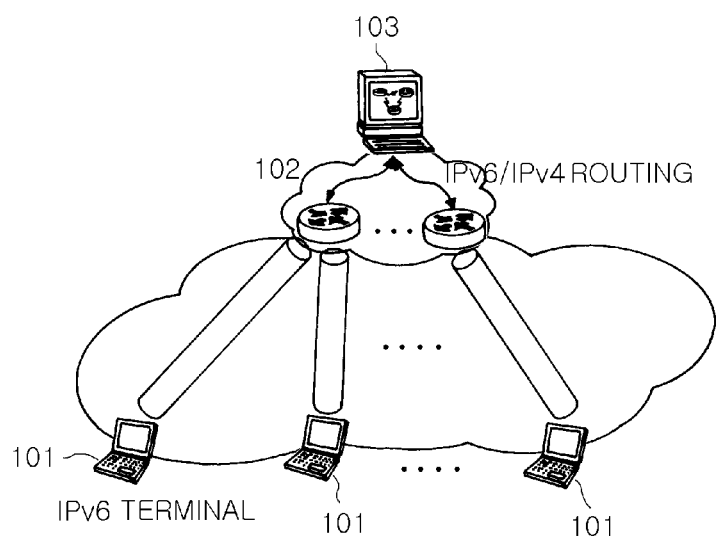
FIG. 1 is a view illustrating tunnel configuration through edge routers in a server based IPv6 over IPv4 transition system according to an embodiment of the present invention.

Exemplary embodiments of the present invention will now be described in detail with reference to the accompanying drawings. Like reference numerals designate like elements throughout the specification. In the description, the detailed descriptions of well-known functions and structures may be omitted so as not to hinder the understanding of the present invention.

FIG. 1 is a view illustrating a server based IPv6 over IPv4 transition system including tunnel edge routers and a server according to an embodiment of the present invention.

Referring to FIG. 1, the IPv6 over IPv4 transition system includes a plurality of terminals 101, a plurality of routers 102 for forming tunnels (referred to as IPv6 over IPv4 tunnels and hereinafter, referred to as control tunnels), and a control server 103 for selecting an edge router 102 for an available tunnel according to a tunnel creation request from a terminal 101 and transmitting/receiving messages to/from the terminal 101 through the selected edge router 102.

The terminal 101 is an IPv6 terminal, requests tunnel creation of the control server 103, and generates a control tunnel with the router 102 according to a result of the requesting.

The edge router 102 may be configured as a dual stack router that can process both IPv4 and IPv6 data. In addition, the edge router 102 communicates with the terminal 101 that requests the tunnel creation through the control tunnel and performs IPv6 communication with the control server 103 through the transmission control protocol (TCP) so as to transmit an IPv4/IPv6 message (tunnel creation request message). In addition, when the edge router 102 attempts initial connection to the control server 103, the edge router 102 transmits a message Init Msg. for a registration request to the control server to inform its presence and transmits the number of tunnels that are currently set and the number of tunnels that can be added to be set.

The control server 103 adds (registers) a new router as the number of terminals 101 increases, stores information on the added router, and periodically checks status information on the added router to perceive whether or not the added router can be used. In addition, the control server 103 determines an edge router 102 that is to form a tunnel with the terminal 101 from among a plurality of the registered routers according to the number of tunnels and availability.

A structure of the edge router 102 that is a device for transiting communications between the terminal 101 and the control server 103 through the created tunnel in the IPv6 over IPv4 transition system having the aforementioned configuration is described in detail with reference to FIG. 2.

Figure 2:
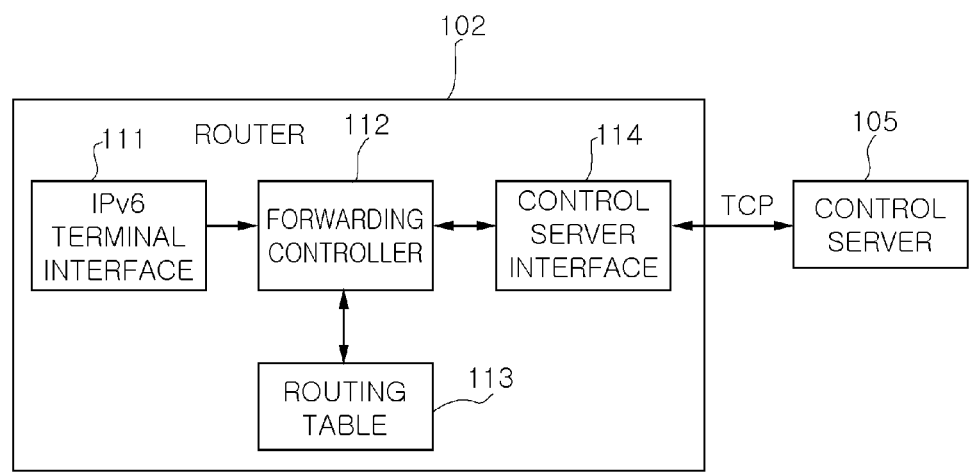
FIG. 2 is a view illustrating a detailed structure of the edge router according to the embodiment of the present invention.

FIG. 2 is a view illustrating a detailed structure of the edge router according to the embodiment of the present invention.

Referring to FIG. 2, the edge router 102 may include an IPv6 terminal interface 111, a forwarding controller 112, a routing table 113, and a control server interface 114.

The IPv6 terminal interface 111 interfaces with the terminal 101 through an IPv4 network and sets a tunnel with the terminal 101 to transmit/receive messages.

The forwarding controller 112 is selected as an edge router for setting a tunnel by the control server 103 to receive a tunnel creation request message from the control server 103 and generates a tunnel interface by using information included in the tunnel creation request message received from the control server 103. In addition, when the terminal 101 receives a tunnel creation response message from the control server 103 and creates a tunnel, the forwarding controller 112 transits communications (referred to as IPv6 over IPv4 transition) between the terminal 101 and the control server 103 through the created tunnel. In addition, the forwarding controller 112 controls IPv6 data forwarding, informs the control server 103 of its presence to create a tunnel, and transmits its status information and information registered in the routing table 113. Here, the status information includes the number of tunnels that are currently set in the edge router 102 and the number of tunnels that can be added to be set.

The routing table 113 registers routing information (IPv4 and IPv6 addresses and the like) on the tunnel interface generated by the forwarding controller 112.

The control server interface 114 performs interfacing to communicate with the control server 103 connected through the TCP, and when receives a message through the creased tunnel from the terminal 101, interfaces with the control server 103 through IPv6.

Additionally, a process for setting the tunnel between the IPv6 terminal and the control server through the router will be described in detail with reference to FIG. 3.

Figure 3:
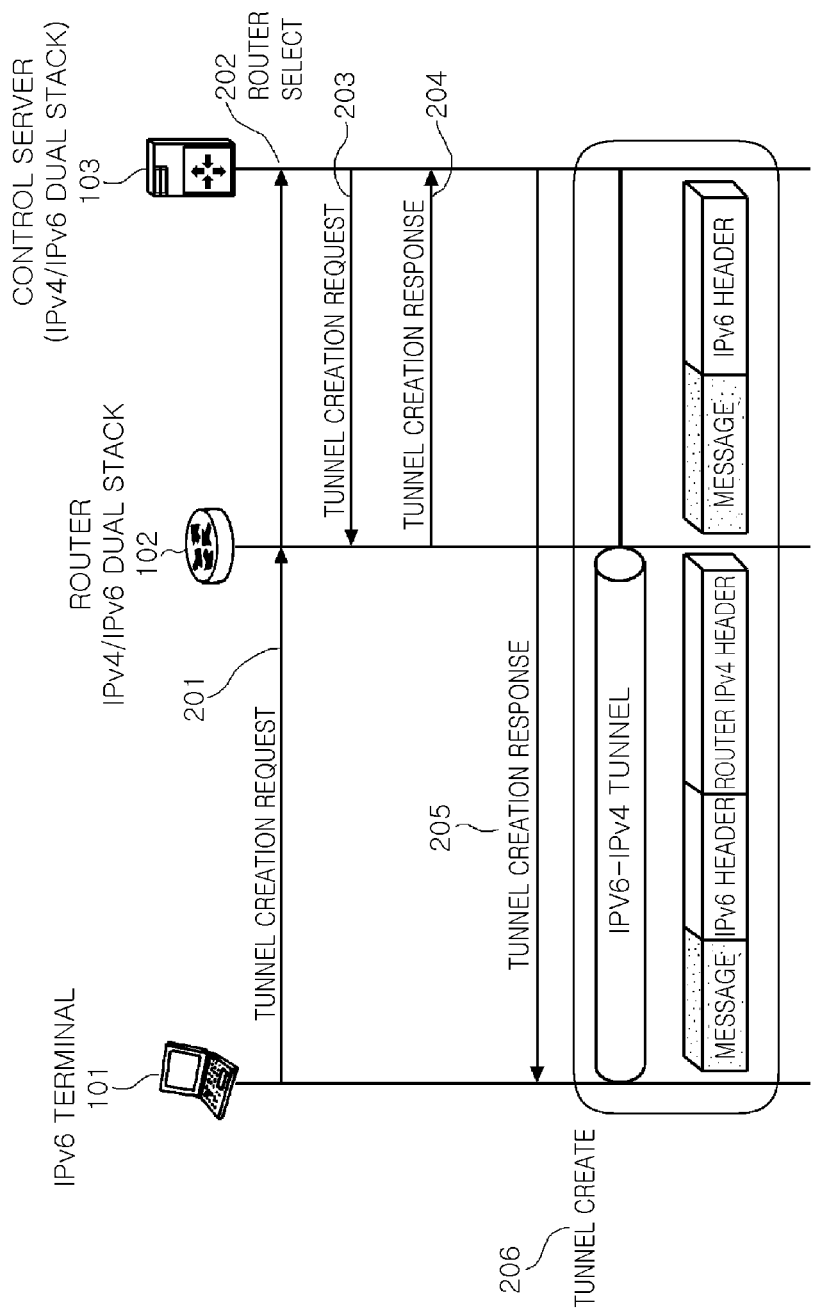
FIG. 3 is a view illustrating a process for setting a tunnel through the edge router in the server based IPv6 over IPv4 transition system according to the embodiment of the present invention.

FIG. 3 is a view illustrating a process for setting a tunnel through a router in the server based IPv6 over IPv4 transition system according to the embodiment of the present invention.

Referring to FIG. 3, in operation 201, a terminal 101 transmits a tunnel creation request message through the IPv4 network to a router 102. Accordingly, the router 102 transmits the tunnel creation request message to the control server 103 through message relaying. Here, since a control tunnel (referred to as an IPv6 over IPv4 tunnel) from the terminal 101 is not generated yet and an IPv4 message type is required, the tunnel creation request message is transmitted in the IPv4 message type.

In addition, in operation 202, the control server 103 that receives the tunnel creation request message stores information (NAT, Port, IPv4 private address, IPv4 global address, IPv6 address, and the like) on terminals, and selects an edge router 102 of the tunnel from among a plurality of the routers to practically generate a control tunnel in consideration of the number of current tunnels, utilization of the tunnels, and the like.

Accordingly, the edge router 102 selected in operation 203 receives the tunnel creation request message from the control server 103, and the edge router 102 selected in operation 204 transmits a tunnel creation response message to the control server 103. Here, the selected edge router 102 creates a tunnel interface by using information included in the tunnel creation request message and registers routing information in the routing table 113.

Accordingly, in operation 205, the edge router 102 transmits the tunnel creation response message including the received information for tunnel creation to the terminal 101 through the control server 103. Thereafter, in operation 206, the terminal 101 creates a control tunnel to the edge router 102 by using the information included in the tunnel creation response message. Here, the terminal 101 requests information on a reception terminal to be communicated from the control server 103 through the created control tunnel. In summary, the terminal 101 sets the control tunnel with the router 102, and accordingly the router 102 communicates with the control server 103 through IPv6.

The operations of the control server in the process for setting the tunnel are described in detail with reference to FIG. 4.

Figure 4:
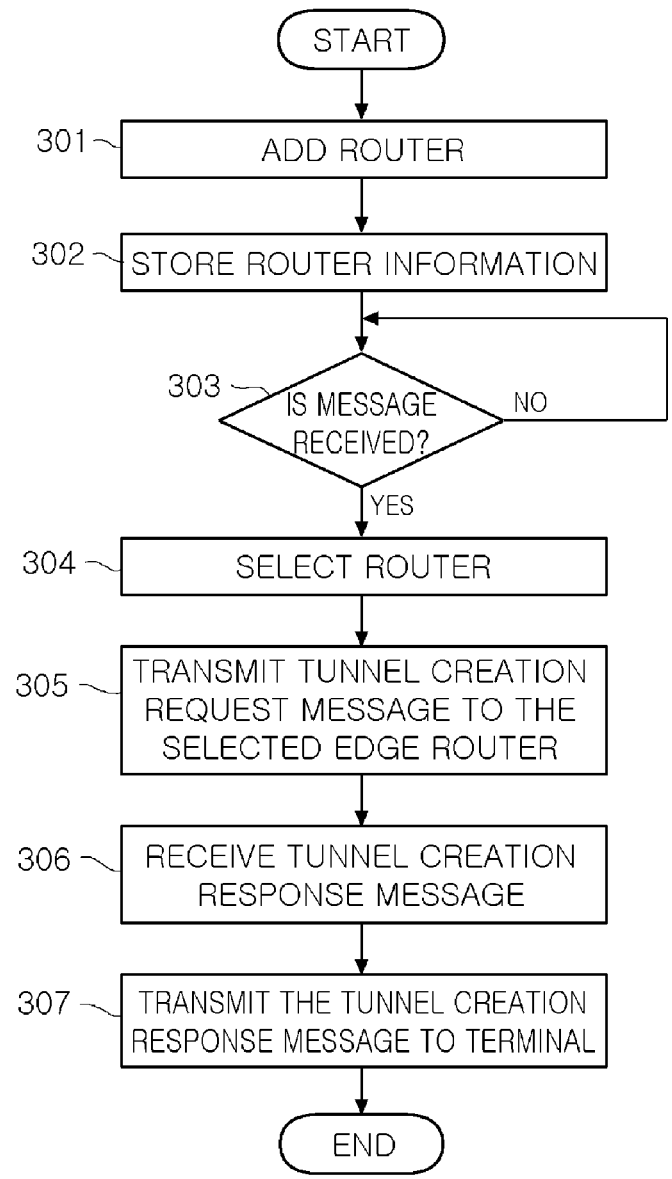
FIG. 4 is a view illustrating operations for determining a router to create a tunnel from a terminal performed by the control server according to the embodiment of the present invention.

FIG. 4 is a view illustrating operations for determining a router to create a tunnel from a terminal performed by the control server according to the embodiment of the present invention.

Referring to FIG. 4, in operation 301, when a new router requests to be registered, the control server 103 adds (registers) the new router, and in operation 302, the control server 103 stores information on the number of tunnels set by the new router or types of available tunnels and sets connection. By registering the new router in the control server 103 as needed as the number of service terminals increases, a proper router can be selected from among the registered routers as the edge router 102 to create a tunnel.

Next, when the control server 103 receives the tunnel creation request message from the terminal 101 in operation 303, the control server 103 retrieves edge router information stored in advance and selects an edge router to form a tunnel with the terminal 101 from the routers in operation 304. Here, the control server 103 determines the number of tunnels set for each router, availability of tunnels, and an amount of data used for the tunnel and selects a proper router.

Thereafter, the control server 103 transmits the tunnel creation request message to the selected edge router 102 to instruct to set a tunnel in operation 305, receives a tunnel creation response message including a result of setting the tunnel from the edge router 102 in operation 306, and transmits the received tunnel creation response message to the terminal 101 in operation 307. Here, a structure of the tunnel creation request message is as illustrated in FIG. 5. The tunnel creation request message includes an IP header, cmd, Type, Nat, LifeTime, an IPv4 address (referred to as a care of address (CoA)) of a terminal, and a field of an IPv6 address of a terminal, and the tunnel creation request message further includes a private CoA field when the terminal belongs to CoA and Nat. Here, the cmd field represents an operation, the Type field represents a tunnel type (for example, IPv6 over IPv4 and the like), and the NatPort represents whether the terminal belongs to Nat.

Figure 6:
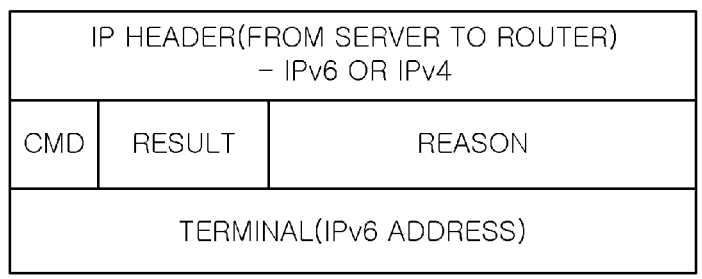
FIG. 6 is a view illustrating a tunnel response message transmitted from the tunnel edge router to the control server in the server based IPv6 over IPv4 transition system according to the embodiment of the present invention.

A structure of the tunnel creation response message is as illustrated in FIG. 6 and includes an IP header, cmd, result, reason, and an IPv6 address field of the terminal. Here, the result field represents a tunnel setting result, and the reason field represents a cause in a case of failure.

Operations of creating a control tunnel and processing control message packets transceived through the created control tunnel in the IPv6 over IPv4 system are described in detail with reference to FIG. 7.

Figure 7:
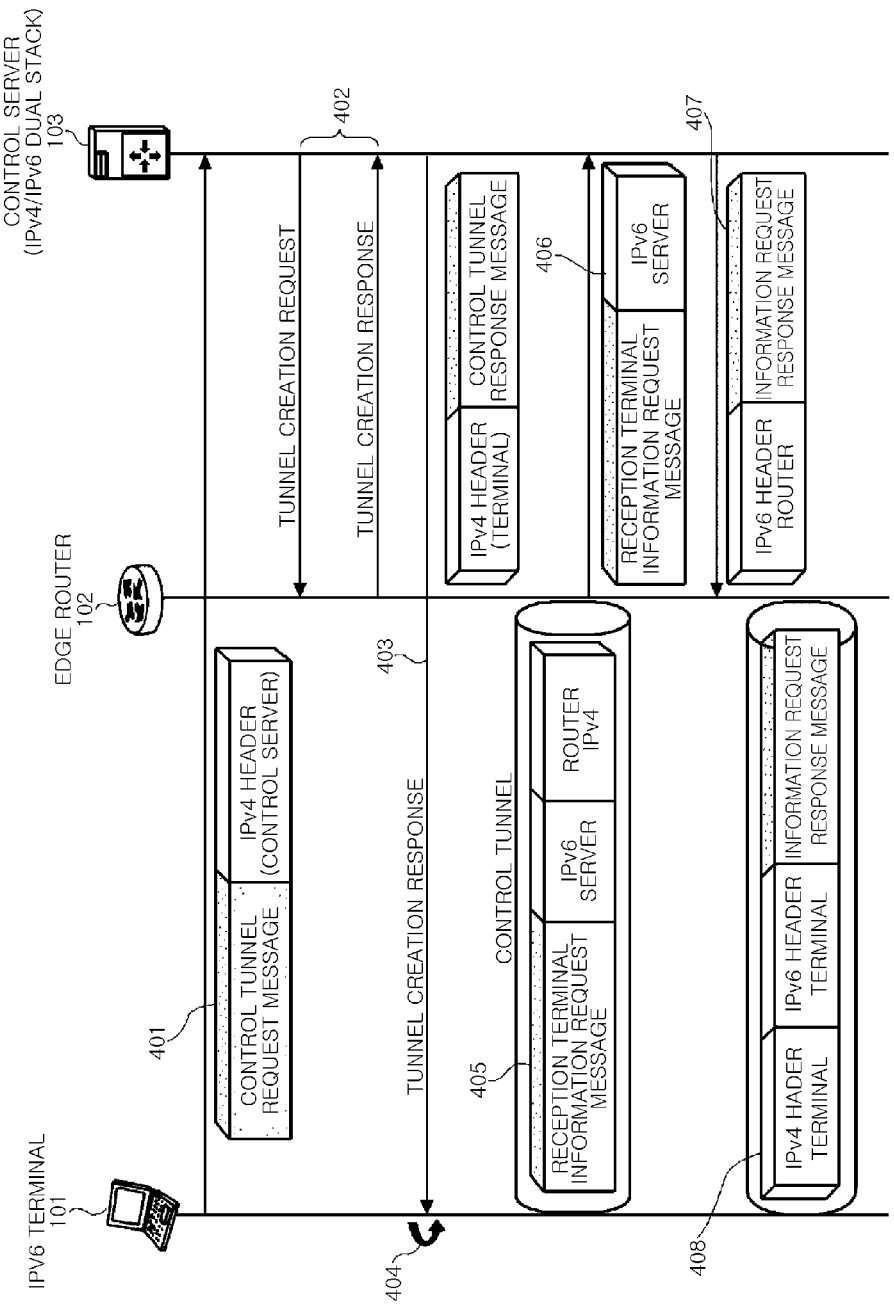
FIG. 7 is a view illustrating operations of processing control message packets for IPv6 over IPv4 transition according to the embodiment of the present invention.

FIG. 7 is a view illustrating operations of processing control message packets for IPv6 over IPv4 transition according to the embodiment of the present invention.

Referring to FIG. 7, in operation 401, the control server 103 receives a control tunnel creation request message through IPv4 from the terminal 101. Accordingly, in operation 402, the control server 103 transmits the control tunnel creation request message to the router 102, receives a control tunnel creation response message from the router 102, and transmits the control tunnel creation response message to the terminal 101.

The terminal 101 receives the control tunnel response message and generates a control tunnel. Thereafter, in operation 405, the terminal 101 requests information on a reception terminal that is to be communicated from the control server 103 by using the created control tunnel. Here, the IPv6 over IPv4 control tunnel is used. In this case, the IPv4 header includes information including a router 102 disposed on the edge of the tunnel as a destination, and the IPv6 header includes information including the control server 103 as a destination.

Accordingly, in operation 406, since the IPv4 header included in the information request message indicates the router 102, the router 102 performs IPv6 lookup and transmits the reception terminal information request message including the lookup information to the control server 103. Thereafter, in operation 407, the router 102 receives a response message for the information request from the control server 103. Accordingly, in operation 408, the router 102 transmits a response message for the information request through the control terminal having a destination as the terminal 101.

Figure 8:
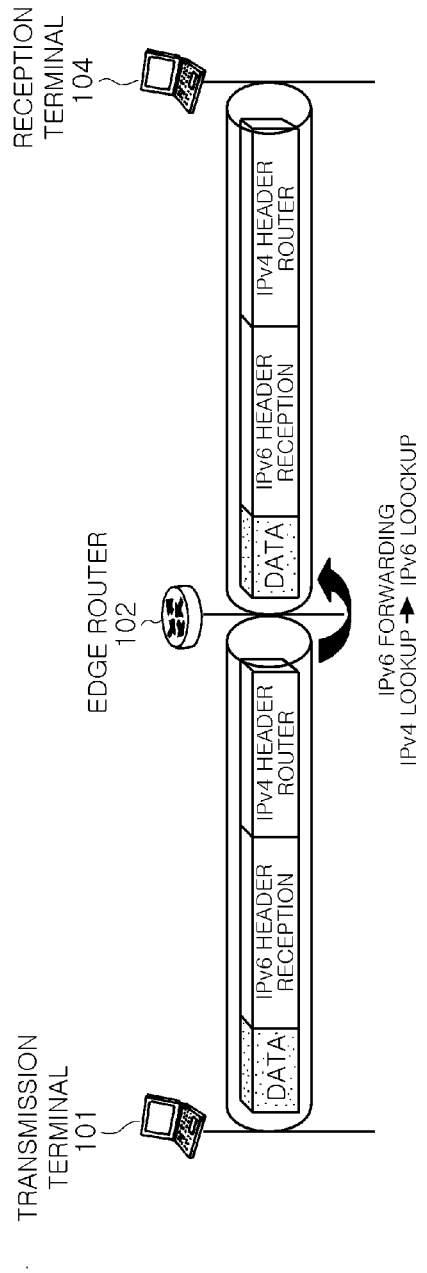
FIG. 8 is a view illustrating data forwarding in the server based IPv6 over IPv4 transition system according to the embodiment of the present invention.

As described above, data forwarding between transmission/reception terminals using the created control tunnel is as illustrated in FIG. 8. Here, since IPv6 routing information is set in the router at a point for generating the control tunnel, data forwarding using the control tunnel is possible. Referring to FIG. 8, a first control tunnel is created between the transmission terminal 101 and the edge router 102, and packets forwarded through the control tunnel include data in a payload interval, and include information on the reception terminal and information on the router 102 in IPv6 and IPv4 headers and in the IPv4 header, respectively. In addition, a second control tunnel is created between the router 102 and the reception terminal 104, and packets forwarded through the second control tunnel include data in a payload interval, and include information on the reception terminal in the IPv6 header and the IPv4 header.

Figure 9:
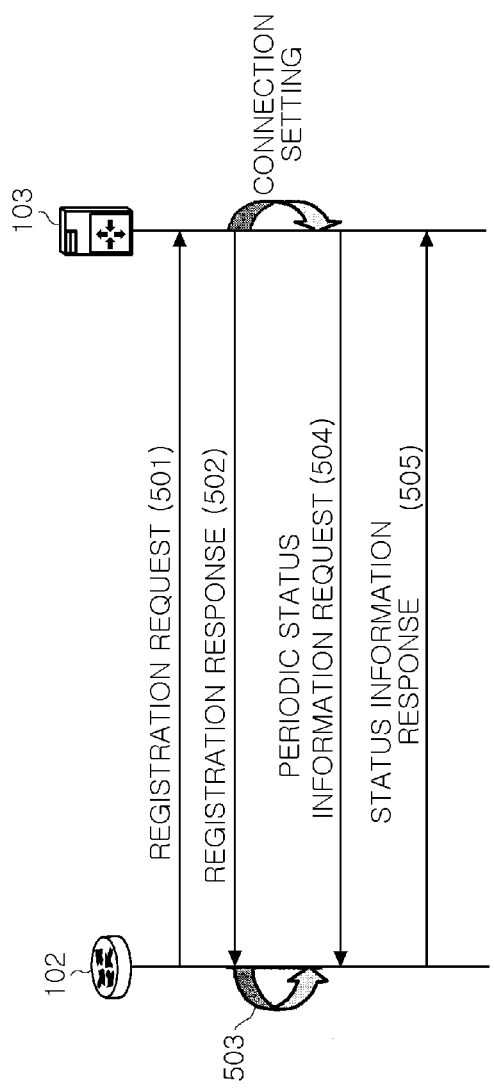
FIG. 9 is a view illustrating operations of checking connection between the edge router and the control server in the server based IPv6 over IPv4 transition system according to the embodiment of the present invention.

As illustrated in FIG. 9, the router 102 and the control server 103 periodically check the opposing statuses using TCP connection.

Referring to FIG. 9, in operation 501, in a case where the router 102 attempts connection to the control server 103, the router 102 initially transmits a message Init Msg. for a registration request to the control server 103 to inform its presence and transmits information on the number of terminals that are set in the router 102 and the number of tunnels that can be added to be set. Thereafter, the control server 103 checks whether or not the router 102 can be used by using the received information and transmits a registration request response message including its information (address) to the router 102.

Accordingly, in operation 502, the router 102 receives the registration request response message from the control server 103 and in operation 503, sets connection with the control server 103.

Thereafter, in operation 504, the router 102 receives a status information request message for periodic status maintenance from the control server 103, and in operation 505, the router 102 transmits a status information response message to the control server 103. Accordingly, the control server 103 can periodically check whether or not the router 102 is in an available status. Here, if there is no response within a predetermined time, the control server 103 recognizes that the edge router 102 it not available and does not transmit a tunnel creation message.

While the present invention has been particularly shown and described with reference to exemplary embodiments thereof, it will be understood by those skilled in the art that various changes in form and details may be made therein without departing from the spirit and scope of the present invention as defined by the appended claims.

The invention claimed is:

1. A method of performing IPv6 over IPv4 transition to improve performance of a control server, the method comprising:
    selecting, by the control server, a router among a plurality of routers based on status information of the plurality of routers;
    receiving, by the selected router, a tunnel creation request message from the control server;
    transmitting a tunnel creation response message, in response to the tunnel creation request message, from the router to an IPv6 terminal through the control server;
    creating a tunnel between the router and the IPv6 terminal;
    performing IPv6 over IPv4 transition via the selected router, without involving the control server, upon a request for information on a reception terminal, which is received from the IPv6 terminal through the created tunnel; and
    forwarding data between the IPv6 terminal and the reception terminal through the created tunnel without involving the control server,
    wherein the status information of the plurality of the routers includes a number of tunnels that are currently set, a number of tunnels that can be added to be set, and an amount of data used for the tunnel.

2. The method of claim 1, the method further comprising:
    registering routing information included in the tunnel creation request message in a routing table.

3. The method of claim 2, wherein the step of performing IPv6 over IPv4 transition is performed by using the routing table.

4. The method of claim 3, wherein the step of forwarding data between the IPv6 terminal and the reception terminal includes:
    forwarding a message including IPv6 header information and an IPv4 header including destination router information received from the IPv6 terminal to the reception terminal.

5. The method of claim 1, wherein the step of performing the IPv6 over IPv4 transition comprises steps of:
    receiving a message including an IPv6 header and IPv4 header information from the IPv6 terminal through the created tunnel;
    performing IPv6 lookup on the IPv4 header information included in the received message; and
    transmitting a message including the IPv6 lookup information to the control server.

6. The method of claim 1, the method further comprising:
    periodically transmitting status information of the plurality of routers from the router to the control server.

7. A method of performing IPv6 over IPv4 transition to improve performance of a control server, the method comprising:
    receiving, by the control server, a first tunnel creation request message from the IPv6 terminal in an IPv4 network through the IPv4 network;
    selecting, by the control server, a router among a plurality of routers based on status information of the plurality of the routers, the plurality of routers being previously registered to create a tunnel between the each of the plurality of routers and the IPv6 terminal;
    transmitting a second tunnel creation request message from the control server to the selected router;
    receiving, by the control server, a tunnel creation response message corresponding to the second tunnel creation request message from the selected router;
    transmitting, by the control server, the received tunnel creation response message to the IPv6 terminal to create a tunnel between the selected router and the IPv6 terminal;
    performing IPv6 over IPv4 transition via the selected router without involving the control server, upon a request for information on a reception terminal, which is received from the IPv6 terminal through the created tunnel; and
    forwarding data between the IPv6 terminal and the reception terminal through the created tunnel, without involving the control server,
    wherein the status information of the plurality of the routers includes the number of tunnels that are currently set and the number of tunnels that can be added to be set, and an amount of data used for the tunnel.

8. The method of claim 7, the method further comprising, registering an additional router in the IPv4 network.

9. The method of claim 8, wherein the step of registering the additional router comprises steps of:
- receiving, by the control server, a registration request message including the status information from the additional router;
- checking whether or not the additional router is available based on the status information;
- setting a connection with the additional router by using the status information when the additional router is determined to be available;
- transmitting a registration response message in response to the registration request message to the additional router; and
- transmitting/receiving a message periodically for checking status information of the additional router.

10. The method of claim 7, the method further comprising: deleting the created tunnel between the selected router and the IPv6 terminal after a predetermined time.

11. An apparatus coupled to an IPv6 terminal and a control server and configured to perform IPv6 over IPv4 transition, the apparatus comprising:
- an IPV6 terminal interface configured to interface with the IPv6 terminal through an IPv4 network;
- a forwarding controller configured to:
  - (i) receive a tunnel creation request message from the control server;
  - (ii) transmit a tunnel creation response message, in response to the tunnel creation request message, to a IPv6 terminal through the control server;
  - (iii) create a tunnel between the IPV6 terminal interface and the IPv6 terminal;
  - (iv) perform IPv6 over IPv4 transition, without involving the control server, upon a request for information on a reception terminal which is received from the IPv6 terminal through the tunnel created;
  - (v) forward data between the IPv6 terminal and the reception terminal through the tunnel created, without involving the control server; and
  - (vi) periodically transmit status information of the apparatus to the control server;
- a routing table configured to register route information included in the tunnel creation request message; and
- a control server interface configured to interface with the control server,
- wherein the status information is used for selecting an apparatus among a plurality of apparatus by the control server; and
- wherein the status information of the plurality of the routers includes a number of tunnels that are currently set, a number of tunnels that can be added to be set, and an amount of data used for the tunnel.

12. The apparatus of claim 11, wherein the forwarding controller is further configured to receive a message including IPv6 header information and IPv4 header information from the IPv6 terminal and perform IPv6 lookup on the IPv4 header information included in the received message to transmit a message including the IPv6 lookup information to the control server.

* * * * *